(12) United States Patent
Chandrasekaran et al.

(10) Patent No.: US 7,451,290 B2
(45) Date of Patent: Nov. 11, 2008

(54) METHOD AND MECHANISM FOR ON-LINE DATA COMPRESSION AND IN-PLACE UPDATES

(75) Inventors: Sashikanth Chandrasekaran, Belmont, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/433,174

(22) Filed: May 11, 2006

(65) Prior Publication Data

US 2006/0212672 A1 Sep. 21, 2006

Related U.S. Application Data

(62) Division of application No. 10/246,964, filed on Sep. 18, 2002, now Pat. No. 7,058,783.

(51) Int. Cl.
G06F 12/00 (2006.01)

(52) U.S. Cl. .................................... 711/171; 711/154

(58) Field of Classification Search ............ 711/111, 711/112, 114, 171, 154

See application file for complete search history.

(56) References Cited

U.S. PATENT DOCUMENTS

| | | | |
|---|---|---|---|
| 4,862,167 A | 8/1989 | Copeland, III | |
| 5,237,460 A * | 8/1993 | Miller et al. | 360/8 |
| 5,357,431 A | 10/1994 | Nakada et al. | |
| 5,414,834 A | 5/1995 | Alexander et al. | |
| 5,426,426 A | 6/1995 | Hymel | |
| 5,627,995 A | 5/1997 | Miller et al. | |
| 5,787,415 A | 7/1998 | Jacobson et al. | |
| 5,918,225 A | 6/1999 | White et al. | |
| 5,936,560 A | 8/1999 | Higuchi | |
| 6,006,232 A | 12/1999 | Lyons | |
| 6,112,209 A | 8/2000 | Gusack | |
| 6,199,070 B1 | 3/2001 | Polo-Wood et al. | |
| 6,205,453 B1 | 3/2001 | Tucker et al. | |
| 6,208,273 B1 | 3/2001 | Dye et al. | |
| 6,360,300 B1 | 3/2002 | Corcoran et al. | |
| 6,374,266 B1 | 4/2002 | Shnelvar | |
| 6,427,145 B1 | 7/2002 | Hara et al. | |
| 6,721,751 B1 | 4/2004 | Furusho | |
| 6,760,907 B2 | 7/2004 | Shaylor | |
| 6,823,329 B2 | 11/2004 | Kirk et al. | |

(Continued)

FOREIGN PATENT DOCUMENTS

EP 0079465 A2 5/1983

OTHER PUBLICATIONS

Bassiouni, M.A. "Data Compression in Scientific and Statistical Databases" IEEE Transactions on Software Engineering, Oct. 1985, vol. SE-11, No. 10, pp. 1047-1058.

(Continued)

*Primary Examiner*—Brian R Peugh
(74) *Attorney, Agent, or Firm*—Vista IP Law Group LLP

(57) ABSTRACT

A method and mechanism is disclosed for implementing storage and compression in a computer system. Each granular portion of a file can be individually stored in either a compressed storage unit or an uncompressed storage unit. The storage units can be allocated apriori or on an as-needed basis.

20 Claims, 6 Drawing Sheets

U.S. PATENT DOCUMENTS

| | | | |
|---|---|---|---|
| 7,058,783 | B2 | 6/2006 | Chandrasekaran et al. |
| 7,071,999 | B2* | 7/2006 | Lee .............................. 348/714 |
| 7,103,608 | B1 | 9/2006 | Ozbutun et al. |
| 2002/0073298 | A1 | 6/2002 | Geiger et al. |
| 2002/0107988 | A1 | 8/2002 | Jordan |
| 2003/0009595 | A1 | 1/2003 | Collins |
| 2003/0023536 | A1 | 1/2003 | Hollerman et al. |
| 2003/0028509 | A1 | 2/2003 | Sah et al. |
| 2003/0065662 | A1 | 4/2003 | Cosic |
| 2003/0212694 | A1 | 11/2003 | Potapov et al. |
| 2004/0003196 | A1* | 1/2004 | Wilson et al. ................ 711/171 |
| 2004/0034616 | A1 | 2/2004 | Witkowski et al. |
| 2004/0162954 | A1* | 8/2004 | Chauvel ...................... 711/155 |
| 2005/0268068 | A1* | 12/2005 | Ignatius et al. ............... 711/202 |

OTHER PUBLICATIONS

Bayer, R. et al. "Organization and Maintenance of Large Ordered Indexes" Acta Informatica, 1972, vol. 1, pp. 173-189.

Beckmann, N. et al. "The R*-tree: An Efficient and Robust Access Method for Points and Rectangles+" Proceedings of the ACM SIGMOD International Conference on Management of Data (SIGMOD '92), San Diego, CA, Jun. 2-5, 1992, pp. 322-331.

Benveniste, C.D. et al. Cache-Memory Interfaces in Compressed Memory Systems, IEEE Transactions on Computer, Nov. 2001, vol. 50, No. 11, pp. 1106-1116.

Berchtold, S. et al. "The X-tree: An Index Structure for High-Dimensional Data" Proceedings of the 22nd International Conference on Very Large Databases (VLDB '96), Bombay, India, Sep. 3-6, 1996, pp. 28-39.

Chen, W.T. et al. "Counter for Full Table Scan Control in Data Redistribution" IBM Technical Disclosure Bulletin, Sep. 1, 1992, vol. 35, No. 4B, pp. 3-4.

Chen, Z. et al. "An Algebraic Compression Framework for Query Results" Proceedings of the 16th International Conference on Data Engineering (ICDE '00), San Diego, CA, Feb. 29-Mar. 3, 2000, pp. 177-188.

Cockshott, W.P. et al. "Data Compression in Database Systems" Proceedings of the 9th International Workshop on Database and Expert Systems Applications, Vienna, Austria, Aug. 26-28, 1998, pp. 981-990.

comp.compression Frequently Asked Questions (part 1/3), last modified Sep. 5, 1999, pp. 1-65, located at: http://www.faqs.org/faqs/compression-faq/part1/.

comp.compression Frequently Asked Questions (part 2/3), last modified Sep. 5, 1999, pp. 1-37, located at: http://www.faqs.org/faqs/compression-faq/part2/.

comp.compression Frequently Asked Questions (part 3/3), last modified Sep. 5, 1999, pp. 1-13, located at: http://www.faqs.org/faqs/compression-faq/part3/.

Couchman, J.S. "Oracle Certified Professional DBA Certification Exam Guide" 1998, Title page, copyright page, table of contents and pp. 54, 59, 69, 109-111, 125-131,133,185, 233, 271, 416, 460 and 503-512 provided, Osborne McGraw-Hill, Berkeley, CA.

deCastro, R.S. et al. "Adaptive Compressed Caching: Design and Implementation" Proceedings of the 15th Symposium on Computer Architecture and High Performance Computing (SBAC-PAD '03), Nov. 10-12, 2003, pp. 10-18.

Eggers, S.J. et al. "A Compression Technique for Large Statistical Databases" Proceedings of the 7th International Conference on Very Large Databases (VLDB '81), Cannes, France, Sep. 9-11, 1981, pp. 424-434.

Goldstein, J. et al. "Compressing Relations and Indexes" Technical Report No. 1355, CS Department, University of Wisconsin-Madison, Jun 18, 1997, pp. 1-23.

Goldstein, J. et al. "Compression Relations and Indexes" Proceedings of the 14th International Conference on Data Engineering (ICDE '98), Orlando, FL, Feb. 23-27, 1998, pp. 370-379.

Graefe, G. et al. "Data Compression and Database Performance" Proceedings of the 1991 Symposium on Applied Computing, Kansas City, MO, Apr. 3-5, 1991, pp. 22-27.

Guttman, A. "R-Trees: A Dynamic Index Structure of Spatial Searching" Proceedings of the ACM SIGMOND International Conference on Data Management (SIGMOD '84), Boston Massachusetts, Jun. 18-21, 1984, pp. 47-57.

Leutenegger, S.T. et al. "STR: A Simple and Efficient Algorithm for R-Tree Packing" Technical Report No. 96-02, Mathematics and Computer Science Department, University of Denver, 1996, pp. 1-29.

Lin, K.-I. et al. "The TV-Tree: An Index Structure for High-Dimensional Data" VLDB Journal, 1994, vol. 3, No. 4, pp. 517-542.

Ng, W.K. et al. "Relational Database Compression Using Augmented Vector Quantization" IEEE 11th International Conference on Data Engineering (ICDE '95), Taipei, Taiwan, Mar. 6-10, 1995, pp. 540-549.

Nievergelt, J. et al. "The Grid File: An Adaptable, Symmetric Multikey File Structure" Readings in Database Systems, 1988, Title page, copyright page and pp. 582-598, Morgan Kaufmann Publishers, Inc., San Mateo, CA.

Olken, F. et al. "Rearranging Data to Maximize the Efficiency of Compression" Journal of Computer and System Sciences, Apr. 1989, vol. 38, No. 2, pp. 405-430.

O'Neil, P. et al. "Improved Query Performance with Variant Indexes" Proceedings of the ACM SIGMOD International Conference on Management of Data (SIGMOND '97), Tucson, AZ, May 13-15, 1997, pp. 38-49.

Roth, M.A. et al. "Database Compression" SIGMOD Record, Sep. 1993, vol. 22, No. 3, pp. 31-39.

Seeger, B. et al. "The Buddy-Tree: An Efficient and Robust Access Method for Spatial Data Base Systems" Proceedings of the 16th International Conference on Very Large Databases (VLDB '90) Brisbane, Queensland, Australia, Aug. 13-16, 1990, pp. 590-601.

Segev, A. et al. "Supporting Statistics in Extensible Databases: A Case Study" Proceedings of the 7th International Working Conference on Scientific and Statistical Database Management, Charlottesville, VA, Sep. 28-30, 1994, pp. 54-63.

Shannon, C.E. "A Mathematical Theory of Communication" The Bell System Technical Journal, Jul., Oct. 1948, vol. 27, pp. 379-423, 623-656, reprinted pp. 1-55.

Westmann, T. et al. "The Implementation and Performance of Compressed Databases" Reihe Informatik, Mar. 1998, 14 pgs.

Ziv, J. et al. "A Universal Algorithm for Sequential Data Compression" IEEE Transactions on Information Theory, May 1977, vol. IT-23, No. 3, pp. 337-343.

* cited by examiner

METHOD AND MECHANISM FOR ON-LINE DATA COMPRESSION AND IN-PLACE UPDATES

CROSS-REFERENCE TO RELATED APPLICATIONS

This application is a division of U.S. patent application Ser. No. 10/246,964, filed on Sep. 18, 2002, now U.S. Pat. No. 7,058,783 which is hereby incorporated by reference in its entirety for all purposes as if fully set forth herein.

BACKGROUND AND SUMMARY

The invention relates to computer systems, and more particularly to a method and mechanism for implementing compression in a computer system.

Data compression is a commonly used technique in many modern computer systems. One advantage that is provided by compressing data is the reduced costs for storing data onto storage mediums. Another advantage that is provided by compression techniques is an increase in I/O and transmission efficiency by reducing the amount of data to be sent/received between computing entities or to/from storage devices. The acts of compressing and decompressing data themselves consume a given amount of overhead that is often related to the specific compression algorithm being used and the quantity of data being compressed/decompressed.

A common approach for implementing compression is to compress data at the granularity of the object or file. For example, traditional compression approaches such as the Unix-based gzip or the DOS-based zip commands compress an entire file into a more-compact version of that file. A drawback with this type of approach is that if an entire file is compressed, all or a large part of the file must be decompressed before any part of it can be used, even if only a small part of the file is actually needed by a user. This is a problem that particularly exists with respect to compressing files in database systems, in which a single database file may contain large quantities of database records, but only a small portion of the individual records may be needed at any moment in time. Thus, the granularity of compression/decompression may not realistically match the granularity at which data is desirably used and accessed in the system. Moreover, compression granularities for traditional compression algorithms could result in storage inefficiencies. For example, page-at-a-time compression approaches could lead to compressed pages of different sizes that are inefficiently mapped onto physical pages.

Another approach is to employ content-specific or language-specific granularities when compressing data. In a database context, this approach allows compression and decompression at the level of a tuple or level of individual fields/columns of a database object. In implementation, the "language" layer of a computer system (e.g., the computing layer that processes Structured Query Language or SQL commands in a database system) can be modified to perform compression or decompression based upon the known structure or schema of the data. An advantage with this approach is that smaller granularities of data can be decompressed when accessing data, rather than requiring an entire file of data to be decompressed to access a small portion of the desired data records. However, this approach requires the compression scheme to be directly influenced and possibly specific to a particular data schema used to organize the data. This can significantly affect the maintainability of that data, since the compression scheme may necessarily require updating when a change occurs to the corresponding data schema, e.g., the compression scheme changes if modifications are made to the type, number or order of fields in a database table. The query operators may also need to change if there is a change to the compression scheme or if the data is changed from a compressed state to an uncompressed state, or vice-versa.

Embodiments of the present invention provides a method and mechanism for implementing compression in a computer system. In one embodiment, each granular portion of a file can be individually stored in either a compressed storage unit or in an uncompressed storage unit. The storage units can be allocated apriori or on an as-needed basis. In one embodiment, a directory structure is employed to track storage units for a file. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention provides a method and mechanism for compressing and decompressing data in a computing system. Examples of benefits of utilizing the present compression approach include (a) reducing storage/disk space and (b) reducing the runtime I/O demands on the disk subsystem. For purposes of illustration only, the following description will be made with respect to the compression/decompression of data files in database files using blocks. It is noted, however, that the present invention is applicable to managing other types and granularities of data in a computing system, and thus is not to be limited to compression of just database data or granularities of just files/blocks.

Figure 1:
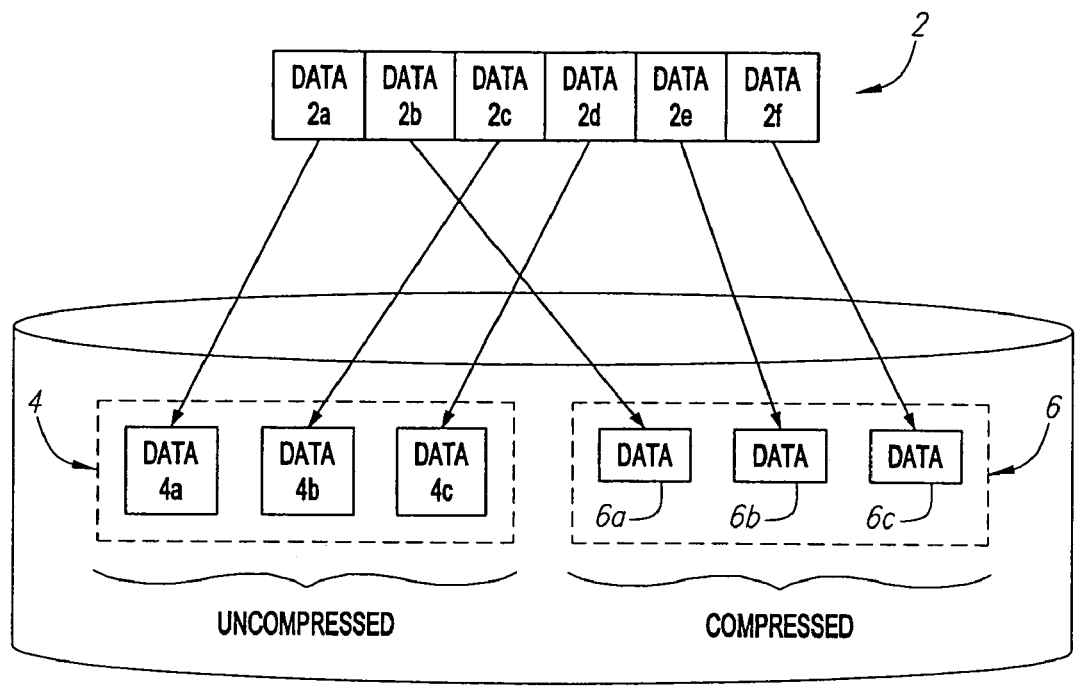
FIG. 1 shows a data storage structure according to an embodiment of the invention.

FIG. 1 is an overview diagram showing an embodiment of the present invention in which a file 2 comprises data portions 2a-f. It is noted that data within a file is not always uniformly compressed. The achievable compression ratio for pieces of data within a file depends upon both the specific compression algorithm being used as well as the type/content of the data being compressed. Despite the non-uniform nature of compression, two or more uniform sizes are selected for the storage units into which the data portions are stored, according to an embodiment of the invention. In the example of FIG. 1, a first set 4 of storage units are configured with a relatively larger size to store uncompressed data portions. A second set 6 of storage units are configured with a relatively smaller size to store compressed data portions.

In operation, if the compressed form of a granular portion of the file fits within the selected size of a compressed storage unit, then that granular portion is compressed and stored in a compressed storage unit. If the compressed form of the granular portion of the file does not fit within the size of a compressed storage unit, then it is maintained in a uncompressed format in a uncompressed storage unit. In the example of FIG. 1, portions 2b, 2e, and 2f of file 2 can fit within the size of a compressed storage unit, and therefore will be stored in compressed storage units 6a, 6b, and 6c respectively. Portions 2a, 2c, and 2d of file 2 cannot fit within the size of a compressed storage unit, and therefore will be stored in uncompressed storage units 4a, 4b, and 4c respectively.

In-line updates and insertions of compressed data may be performed. If the update or insert causes a previously uncompressed data portion to be eligible to be compressed, then that data portion can be compressed and stored in its corresponding compressed storage unit. If the update or insert causes a previously compressed data portion to be uncompressed, then that data portion can be stored in its corresponding uncompressed storage unit. This is in contrast to prior compression schemes, which allow originally compressed data to be in a compressed form, but may not allow in-line updates and insertions of compressed data, e.g., because the prior approaches may be rigid data or metadata structures that cannot allow updated or inserted data portions to be stored in a compressed form (unless the compression scheme itself is changed).

The particular size to employ for the compressed storage units is selected to provide suitable distribution of data into compressed/uncompressed storage units while optimizing disk usage and I/O overhead. Any suitable encoding algorithms may be used to compress each granular portion of a file, such as those based on LZ adaptive dictionary based algorithms.

According to one embodiment, file compression will be implemented below the language layer of a computing system, e.g., at the file I/O layer. This is in direct contrast to compression approaches that are language-specific or content-specific that are implemented at the language layer of a computing system. Implementing compression at this level avoids the drawback of the language-layer approach, which requires the compression algorithm to be specifically tailored for the data schema. This can dramatically reduce the maintenance costs/requirements if the data schema changes in the future. Moreover, implementing file compression at the file I/O layer provides another advantage in that there is significantly less impact on generic code and thereby localizes the changes.

One possible disadvantage of embedding the compression within the file I/O layer is that certain implementations of a database may consider the entire file to be used. As far as the database is concerned all the disk space is consumed, and it would create an OS file of that size. Hence, to save disk space, the file size requirement of the database could be trimmed based on an estimate of the size of the file. In the worst case, none of the data portions in a file may be compressible. In the case that at run time the file runs out of space, then the file can be taken offline and rebuilt in the uncompressed format.

The compression can be implemented at the operating file system level. As will be discussed later, reading or writing a sequence of blocks from or to a compressed file may require multiple I/O system calls to different parts of the compressed file. Since calls across the operating system kernel boundary may be expensive, compression implemented within the OS itself could be more efficient. For the same reason, the compression algorithms described here will work efficiently in those systems that allow I/O operations to be issued to different parts of a file within a single system call.

According to an embodiment, each granular portion of a file can be quantified as a logical block, which can be considered a granularity at which the computing system uses or splits up a file. In an embodiment, a database logical block is 4 k-8 K bytes. The logical block may or may not be the same size as a physical disk block, and in many cases, a physical disk block could be smaller than a logical block, e.g., 512 bytes. In one embodiment, contiguous logical database blocks will not be considered together for compression although they may result in a higher compression ratio. The data returned from a read operation will be presented transparently in the uncompressed logical database block format. Similarly the data supplied by the generic RDBMS code will also be in the form of uncompressed blocks, which will be transparently compressed before writing to the appropriate location on disk. The database file compression will hence be at the granularity of a logical block.

In an embodiment, each compressed and uncompressed storage unit comprises one or more physical disk blocks. The term "compressed blocks" will be used herein to refer to a compressed storage unit and the term "uncompressed block" will refer to an uncompressed storage unit. A compressed block size could be configured to be a multiple of the physical disk block size (e.g. a 8 K logical database block, a 2 K compressed block and a 512 byte physical disk block).

Given that some logical blocks will be stored as compressed blocks while others will be stored in the uncompressed form, various approaches may be employed locate specific logical blocks in the stored versions of the data, e.g., to locate the offset of a logical block in the OS file. With an uncompressed file, the byte offset of a logical block can be determined by multiplying the logical block number with the logical block size (with the possible addition of the length of header information). In an embodiment, with a compressed or partially-compressed file, a determination can be made whether logical block number is compressed or not and then determine where it is stored on disk. If there are multiple compressed block sizes, then a determination can be made which compression block size the given logical block number has been compressed into.

A directory can be maintained to include information that assists in locating the physical or logical location of a logical block. The directory can be physical (i.e., explicitly stored as part of the file or the directory) or logical (i.e., directory derived from other data stored in the file). If the directory is explicitly stored in the file or as part of the directory system, in one embodiment it is small enough that it can always be cached in memory. The directory update protocol should maintain the directory coherent and scale in clusters where multiple database instances may be modifying the same file.

In an embodiment, a given file can contain different sizes of compressed blocks (e.g., a file with a 8 K logical block size having a first set of 1 K compressed blocks and a second set of 2 K compressed blocks along with a set of uncompressed 8 K blocks). One advantage of having multiple sizes of compressed blocks is that a logical block can be compressed into one of the available sizes. With a single compressed block size, data is either compressed or not and a burden is placed on choosing the right size for the compressed block. If the chosen compressed block size is too small, a significant number of blocks may be uncompressed. If too large, then the system neither saves as much disk space nor does it significantly reduce I/O demands. However, the metadata/data structures employed to track the data blocks could be more easily implemented with a single compressed block size. Multiple compressed block sizes may also reduce the effectiveness of multi-block reads, as discussed in more detail below. In one embodiment, if empirical data suggests that more than 75% of the logical blocks can be compressed to less than 25% of the logical block size, then it may be preferable to use a single compressed block size.

Figure 2:
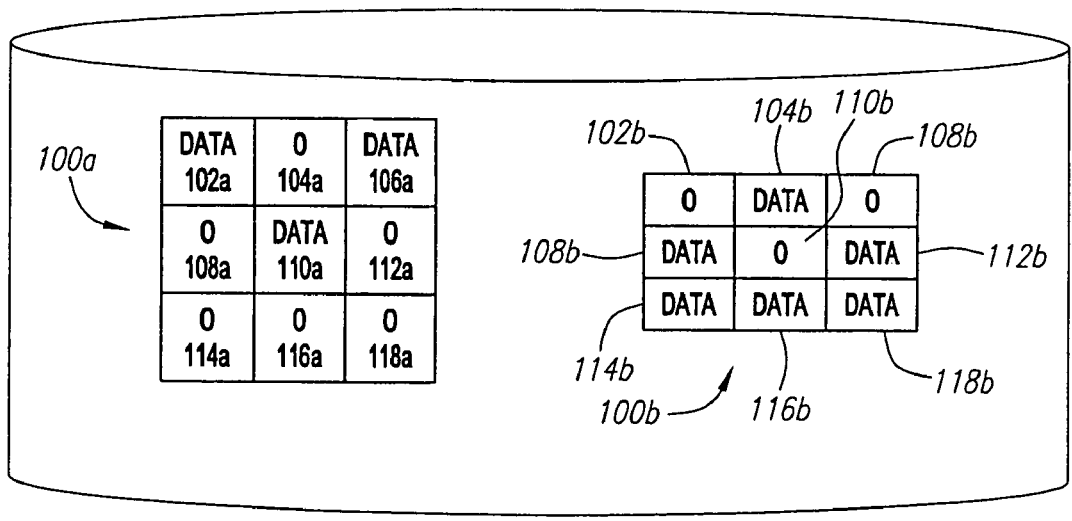
FIG. 2 depicts a structure for storing data according to an embodiment of the invention.

FIG. 2 illustrates a first approach for implementing compression according to an embodiment of the invention, in which both the set 100a of uncompressed storage units and the set 100b of compressed storage units are committed apriori and consumed by the system from the file system. For each logical database block in the file, there is an allotted slot for the block in its compressed format in set 100b and for the block in the uncompressed format in set 100a. In an embodiment, a compressed block stores the size of the actual compressed data in the first four bytes because the compression algorithm may have generated a byte stream whose length is less than size of the compressed block. If the size of the compressed data is 0, then the system can determine that the block is stored in the uncompressed form and read the logical block from the appropriate offset in the file.

In the example of FIG. 2, it can be seen that each allocated slot in uncompressed set 100a includes an equivalent allocated slot in compressed set 100b. Thus, allocated slot 102a in set 100a is matched with slot 102b in set 100b. Similarly, allocated slots 104a-118a in set 100a are matched with slots 104b-118b in set 100b, respectively. If data is stored in an allocated compressed slot in set 100b (e.g., slots 104b, 108b, 112b, 114b, 116b, and 118b), then its corresponding slot in set 100a should not include the uncompressed version of the stored data (e.g., as shown by the value "0" in corresponding slots 104a, 108a, 112a, 114a, 116a, and 118a). If, however, there is no compressed data stored in a given compressed slot in set 100b (e.g., as shown by the value "0" in slots 102b, 106b, and 110b), then uncompressed data should be stored for each corresponding uncompressed slot in set 100a (e.g., in slots 102a, 106a, and 110a).

In an embodiment, the set 100b of compressed blocks is first allocated and then the set 100a of uncompressed blocks is contiguously and immediately allocated from the end of the compressed set 100b. The offset for a given logical block in compressed set 100b can be identified by determining the particular logical block that is being sought or stored (e.g., the 5.sup.th block in a file having 100 blocks) and multiplying that block sequence number by the size of a compressed block, taking into account any header or directory information that may appear before the compressed set 100b. The offset of a given logical block in the uncompressed set 100a can be similarly computed using the block sequence number and uncompressed block size, starting from the end of the space reserved for the compressed blocks which is number of logical blocks in the file multiplied by the compressed block size.

Figures 3, 4:
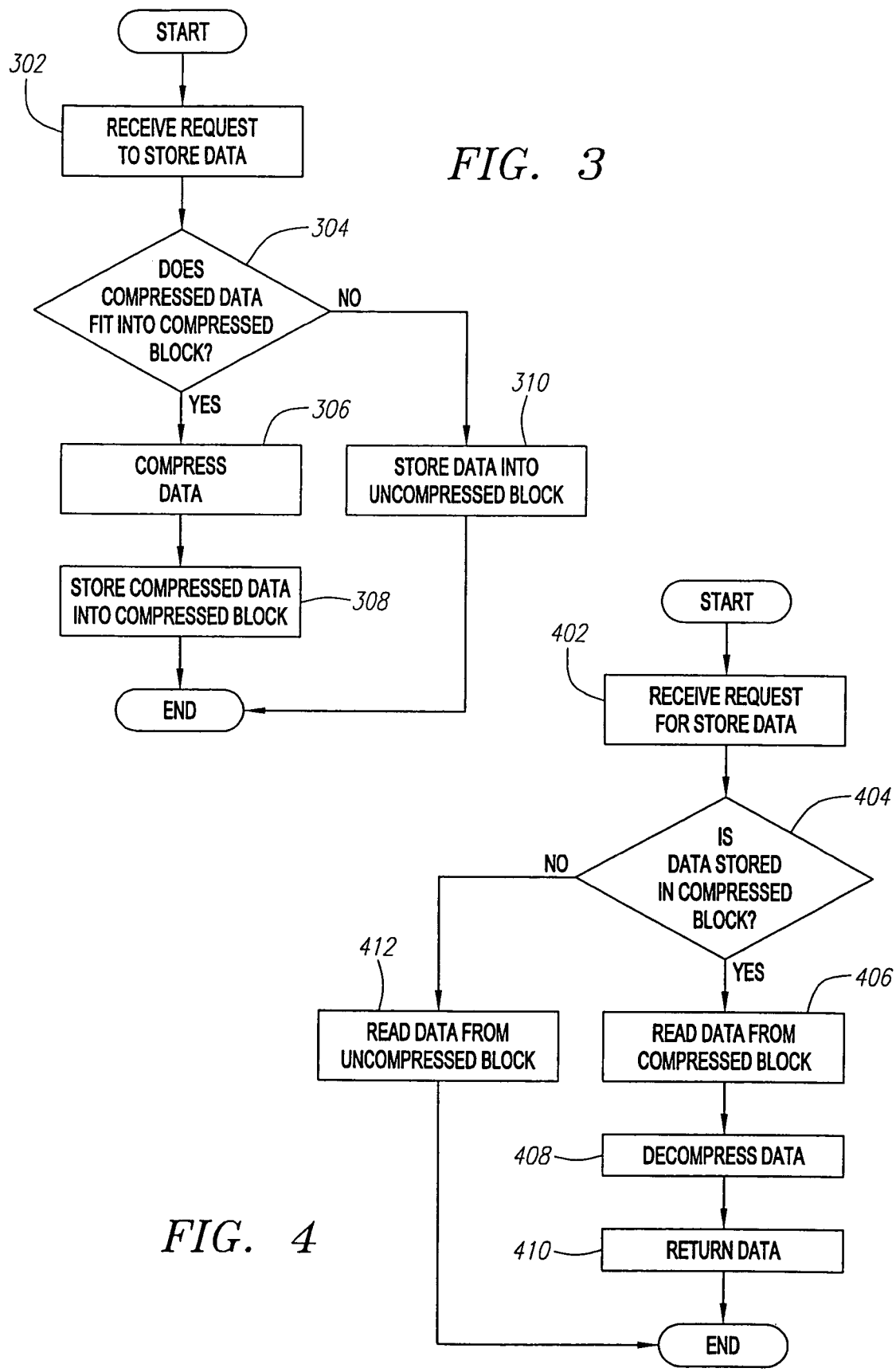
FIG. 3 is a flowchart of an embodiment of a process for storing data.
FIG. 4 is a flowchart of an embodiment of a process for retrieving data.

FIG. 3 shows a flowchart of an embodiment of a process for storing data in the storage format of FIG. 2. At 302, a request is received to store data onto a storage medium. A determination is made at 304 whether the compressed form of the data fits into a compressed block. This determination can be made by actually compressing the data and identifying the resulting compressed data size, or by estimation based upon observable characteristics of the data. If the data is compressible into the required compressed size, then the data is compressed (306) and the compressed data portion is stored into its allocated slot in the set of compressed data blocks (308). If the data was already compressed to make the determination of 304, then it need not be compressed again in 306. If the data is not compressible into the desired compressed size, then the data is stored into its corresponding slot in the set of uncompressed data blocks (310).

FIG. 4 shows a flowchart of an embodiment of a process for retrieving data from the storage format of FIG. 2. At 402, a request is received to retrieve a given data item from the storage medium. A determination is made whether the requested logical block is stored in a compressed block (404). If so, then the compressed data is retrieved from the respective compressed logical block (406) and decompressed using an appropriate decompression algorithm that matches the original compression scheme used to compress the data (408). In an embodiment, the length of the data in the compressed logical block is stored in the compressed block itself, thereby allowing the system to know how much data to retrieve from a particular offset in the storage system. If the data is not stored in the corresponding compressed block, then the uncompressed data is retrieved from the respective uncompressed block (412). In an embodiment, an identifying symbol or flag is used to indicate that the relevant data portion is too large to fit into the compressed block. For example, a length value of "0" can be stored in the compressed block to indicate that the data is too large to fit into the compressed block, and therefore is stored in the corresponding uncompressed block. Once the data has been suitably identified and retrieved, it is thereafter returned to the requesting entity (410).

The format of FIG. 2 can be particularly advantageous when compression is needed to reduce runtime I/O demands, e.g., in terms of disk arms needed to read and write data or in terms of the latency and throughput needed from the disk system and disk space is not a significant concern. One advantage of this format is its simplicity—directory meta-data is not necessary because only simple calculations are needed to determine the offset of any logical block, since all compressed and uncompressed blocks are pre-allocated to correspond to blocks in the original file. Thus, overhead relating to directory maintenance operations are not needed, e.g., when moving a logical block from a compressed format to uncompressed format or vice versa. This helps the approach to scale well in SMP systems and disk clusters. In the case of disk clusters, well-known serialization mechanisms can be used to prevent concurrent writes to the same logical blocks. The format is hence suitable for OLTP (on-line transaction processing) systems that may have significant write activity.

One possible issue of this format is that it may actually consume more disk space than a purely uncompressed file because each logical block has space allotted for the uncompressed and compressed forms. If the compressed block size is 1/n of the logical block size the total disk space consumed may be increased by 1/n. Given the trend of rapid decreases for the costs of storage in computer systems, this issue may not be a significant factor if I/O speed and performance are of paramount importance. A second possible issue is that two I/O operations may be needed to read a logical block that could not be compressed—first to read the compressed block and determine that it is not compressed and the second to read the logical uncompressed block. This second issue can be addressed by using an in-memory directory to map data locations. An additional optimization that can be applied is to store the uncompressed data on relatively slower parts of the disk.

Figure 5:
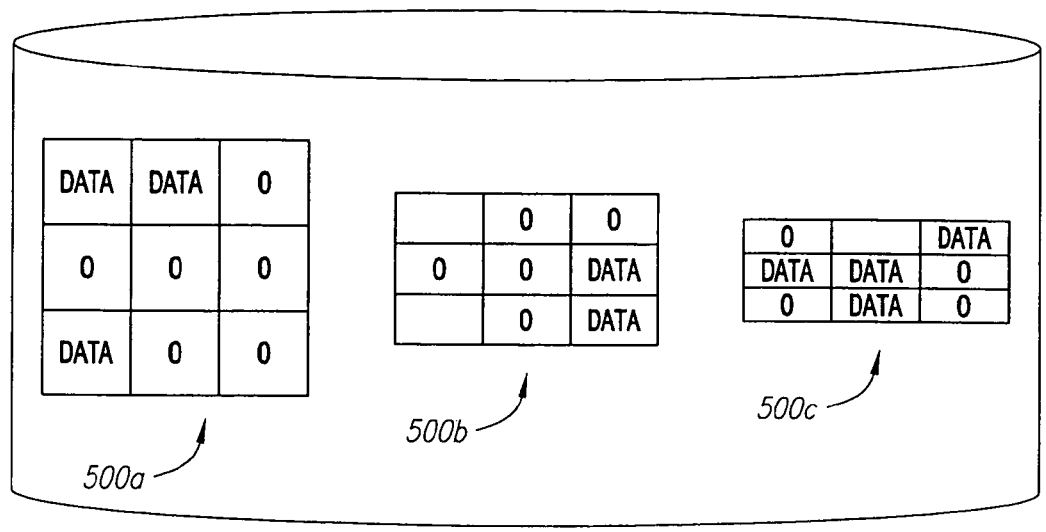
FIG. 5 shows a storage structure comprising multiple sizes for compressed storage units according to an embodiment of the invention.

FIG. 5 illustrates a modification to the approach of FIG. 2, in which multiple sizes of compressed blocks are employed. In particular, shown is a first set 500b of compressed blocks and a second set. 500c of even smaller compressed blocks, in addition to the set 500a of uncompressed blocks. Like the approach of FIG. 2, each set has a pre-allocated slot for each logical block in the file. If a given logical block can be compressed to fit into the smallest compressed block size, then it is stored in its pre-allocated slot in the set of the smallest compressed blocks. If the logical block cannot be compressed into the smallest block size, then a further determination is made whether the logical block can be compressed into the larger compressed block size. If not, then the logical block is stored into its corresponding slot in the set of uncompressed blocks. A flag or indicator is placed associated with each compressed block to identify whether compressed data is being stored in that compressed block.

When attempting to retrieve from this format, the system first attempts to retrieve data from the smallest compressed block corresponding to the relevant logical block. If the data is not stored in that smallest compressed block, then an attempt is made to read the data from the next largest compressed block associated with that logical block. This continues until the data has been read and decompressed from a compressed block, or until it is determined that the data is uncompressed and must be retrieved from the uncompressed block. While FIG. 5 shows only two compressed block sizes, it is noted that any number of compressed block sizes may be employed in the invention.

Figure 6:
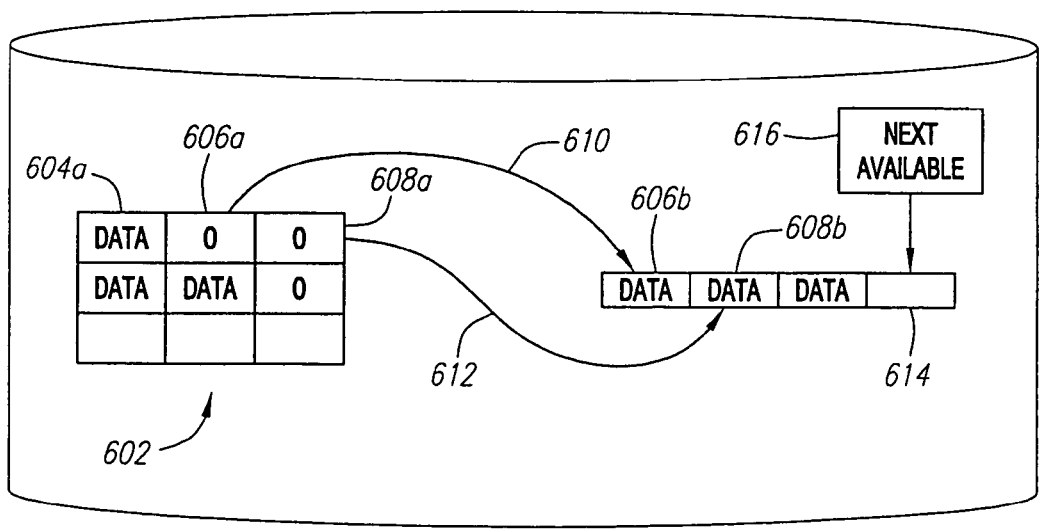
FIG. 6 depicts an alternate structure for storing data according to an embodiment of the invention.

FIG. 6 shows an alternate approach to storing data. The format of FIG. 6 is similar to the format of FIG. 2 in that the space is pre-allocated in a set 602 of compressed blocks for each logical block in the file. However, unlike the approach of FIG. 2, space for each uncompressed logical block is not allotted apriori. Instead, space is allocated for an uncompressed block only if the compressed form of that logical block cannot fit into its allocated compressed block. In this manner, disk space consumption can be reduced.

In the example of FIG. 6, a first compressed block 604a is inhabited with compressed data corresponding to its associated logical block in the original file. Because the compressed form of that data fits into the compressed block 604a, no uncompressed block is allocated for this data. Like the approach of FIG. 2, the data length for the compressed data may be stored within the compressed block.

A second allocated compressed block 606a is not inhabited with compressed data corresponding to its associated logical block. A flag or indicator may be maintained to show that a compressed block does not hold compressed data for its associated logical block. In FIG. 6, this indicator is shown as the value "0", which could correspond to the data length of the compressed data stored in a compressed block. Since the compressed form of that data does not fit into the compressed block 606a, an uncompressed block 606b is allocated to store that data. In an embodiment, compressed block 606a may contain or be associated with a pointer 610 or address structure to point to the location of its corresponding uncompressed block 606b. Similarly, a third compressed block 608a also includes an indicator showing that it does not hold data. Instead, compressed block 608a is also associated with a pointer 612 that points to the location of its corresponding uncompressed block 608b that has been allocated to store its associated data.

A data structure 616 can be maintained to point to the next available location 614 that can be allocated for an uncompressed block. In an embodiment, the file header contains the offset of the file where the next logical uncompressed database block can be stored. When a logical block cannot be compressed within the compressed block size, the file header is first read to determine the offset for writing the uncompressed block. The file header block is locked and updated to reflect the new offset (which is the old offset plus the size of a logical database block), the dummy compressed block is written to "forward" the request to the uncompressed logical block and then the uncompressed block is written. When used with disk clusters, the file header can be pinged to the cluster that needs to write a logical block that was previously stored in the compressed format.

When an uncompressed logical block becomes compressible after an update to the database block, the block can be stored back in the compressed block location. In an embodiment, the previous location of the uncompressed block is de-allocated and reused. This may be accomplished, for example, by maintaining a list of un-allocated blocks to store uncompressed data. Whenever an uncompressed block is needed, one is identified and taken off this list. Once that uncompressed block is no longer needed, its location is added back to the list.

In some cases, the space occupied by the previously uncompressed logical block cannot be easily reclaimed. Depending upon the particular system configuration with which the invention is employed, it may not be feasible to change the "forwarding addresses" of other uncompressed blocks. In this circumstance, the old location of the uncompressed block is stored within the compressed block so that if this block becomes uncompressed again, the old space can be reused. This may happen, for example, if data that was formerly shifted from an uncompressed block into a compressed block is updated or modified such that it again no longer fits into the compressed block. Rather than allocate a new uncompressed block, the old uncompressed block is re-used to store that data. In one embodiment of this approach, several possibilities exist as to the content of a compressed block. In a first possibility, if the compressed data has always fit into the compressed block, then the length value for the compressed data is non-zero (to indicate that there exists compressed data stored in the compressed block) and the pointer/address structure for an associated uncompressed block is empty (to show that the uncompressed block has never been allocated). In a second possibility, if the compressed data presently does not fit into the compressed block, then the length value for the compressed data is zero (to indicate that there does not exist any compressed data in the block) and the pointer/address structure includes a valid location for the uncompressed block that is presently storing the data. In a third possibility, if the compressed data now fits into the compressed block but in the past did not fit, then the length value for the compressed data is non-zero (to indicate that compressed data is presently stored in the compressed block) and the pointer/address structure includes a valid location for the uncompressed block that previously stored the uncompressed data corresponding to the block.

Figure 7:
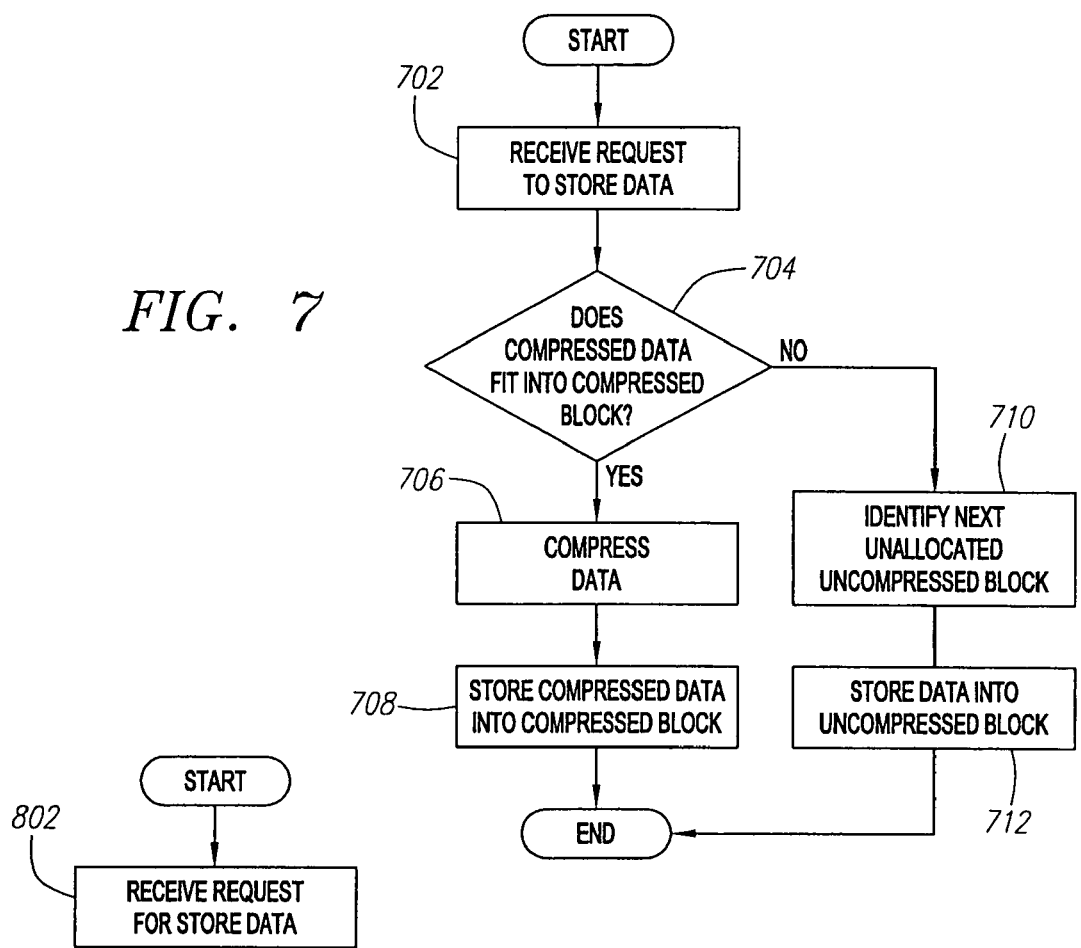
FIG. 7 is a flowchart of an embodiment of a process for storing data.

FIG. 7 is a flowchart of an embodiment of a process for storing data into the format of FIG. 6. At 702, a request is received to stored data onto a storage medium. A determination is made at 704 whether the compressed form of the data fits into a compressed block. This determination can be made by actually compressing the data and identifying the resulting compressed data size, or by estimation based upon observable characteristics of the data. If the data is compressible into the required compressed size, then the data is compressed (706) and the compressed data portion is stored into its allocated slot in the set of compressed data blocks (708). If the data was already compressed to make the determination of 704, then it need not be compressed again in 706.

If the data is not compressible into the desired compressed size, then an identification is made of the location where the next uncompressed block can be allocated (710). As noted above, a pointer structure or file header can be maintained to identify this location. The uncompressed block is thereafter allocated and the data is stored into that uncompressed block (712).

Figure 8:
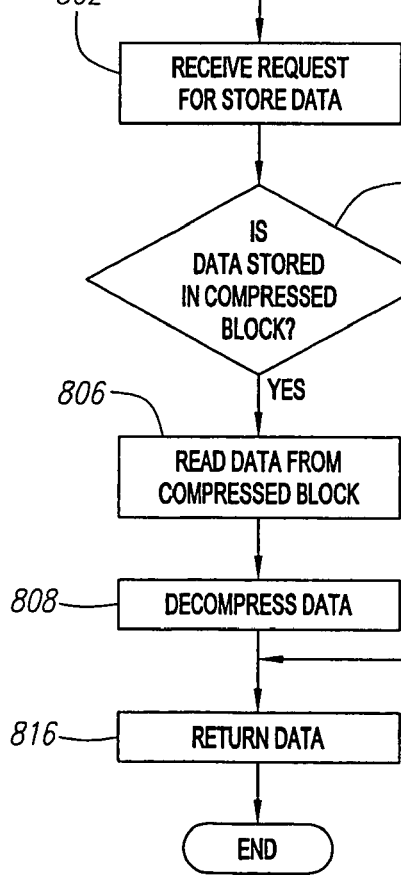
FIG. 8 is a flowchart of an embodiment of a process for retrieving data.

FIG. 8 shows a flowchart of an embodiment of a process for retrieving data from the storage format of FIG. 6. At 802, a request is received to retrieve a given data item from the storage medium. A determination is made whether the requested logical block is stored in a compressed block (804). If so, then the compressed data is retrieved from the respective compressed logical block (806) and decompressed using an appropriate decompression algorithm that matches the original compression scheme used to compress the data (808). In an embodiment, the length of the data in the compressed logical block is stored in the compressed block itself, thereby allowing the system to know how much data to retrieve from a particular offset in the storage system.

If the data is not stored in the corresponding compressed block, then an identification is made of the location for the corresponding uncompressed block that is associated with the compressed block (810). In an embodiment, the address of the uncompressed block is maintained within the associated compressed block. Thus, the address is followed to uncompressed data from the compressed block (812). In an embodiment, an identifying symbol or flag is used to indicate that the relevant data portion is too large to fit into the compressed block. For example, a length value of "0" can be stored in the compressed block to indicate that the data is too large to fit into the compressed block, and therefore is stored in the corresponding uncompressed block. Once the data has been suitably identified and retrieved, it is thereafter returned to the requesting entity (816).

To avoid performing an I/O operation to determine whether a particular logical block is compressed or uncompressed, a directory structure can be maintained that contains this information. In one embodiment, the directory structure comprises a bitmap, e.g., where a bit-on would mean that the corresponding logical block is stored in compressed format and a bit-off means that the logical block is stored in an uncompressed format. If space is already committed to uncompressed blocks (as in the directory format of FIG. 2), it is trivial to compute the byte offset of the logical block in the file. Only one bit is needed to represent a logical block when there is only one compression size. Updates to the directory can be serialized in SMPs as well as clusters.

If space is not committed to uncompressed blocks apriori (as in the directory format of FIG. 6), a persistent directory can be implemented in an embodiment in the form of two-level hash table that performs lookup for the byte offset in the file for a given logical block. A miss in the hash table would indicate that the block is stored in compressed format. The first level of the hash would narrow the directory search for a logical block to a few directory structures (referred to herein as directory blocks, although the unit of storage for this information does not necessarily have to be in individual "blocks") and a binary search can be used within a directory block. For large files, this directory may need to be paged in (similar to a page fault in reading the page table entry). For file sizes that are sufficiently small, it may be feasible to cache the directory in memory. The file header itself may contain the offset of the next uncompressed block that is available for use. Thus, this approach allows a determination of whether a given logical block is compressed or not without performing disk I/O, thereby reducing the latency of reads.

Figure 9:
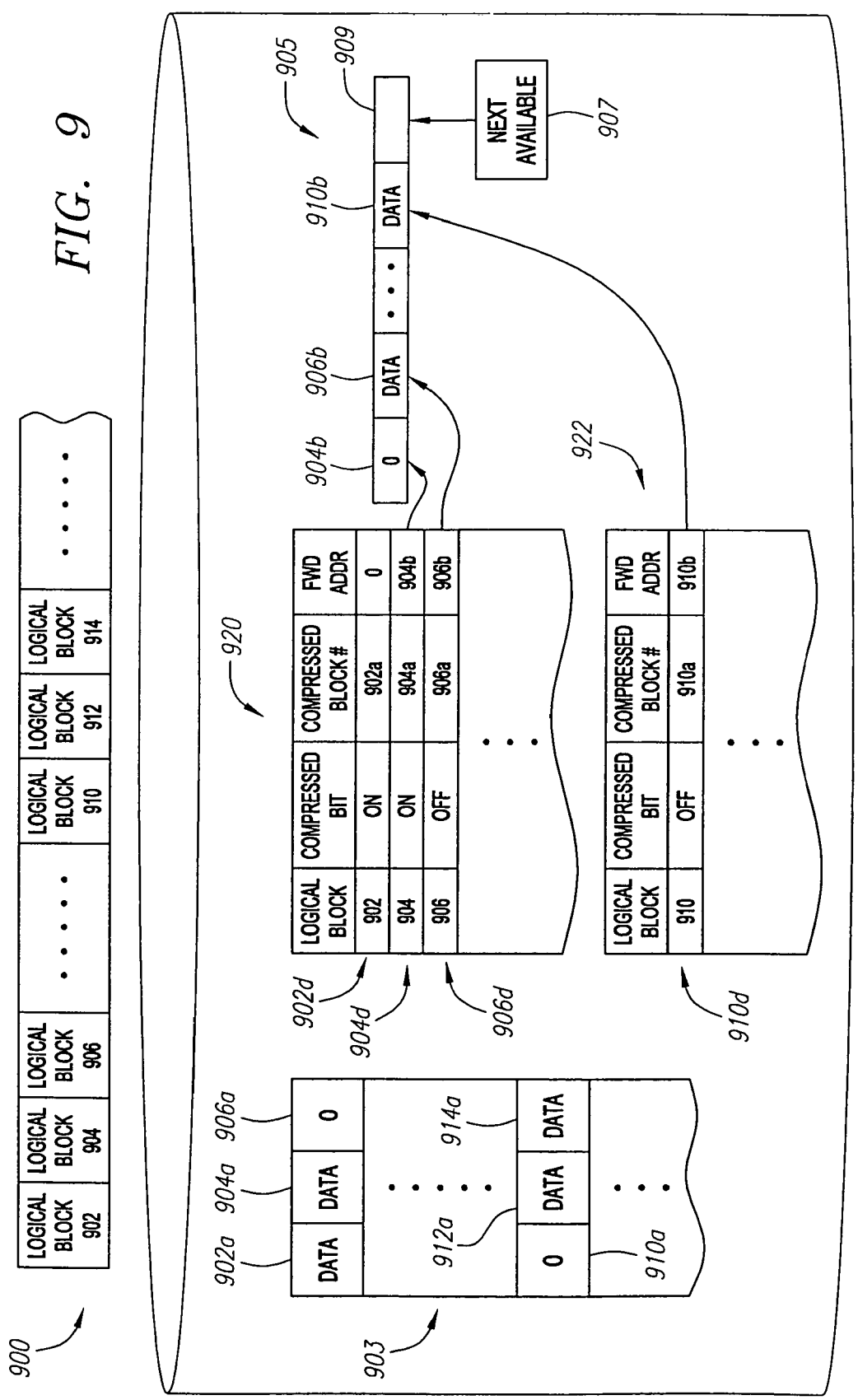
FIG. 9 depicts a structure for storing data comprising a directory according to an embodiment of the invention.

FIG. 9 illustrates an embodiment of this type of directory approach. Assume that file 900 includes a plurality of logical blocks, including logical blocks 902, 904, 906 at the beginning of the file and logical blocks 910, 912, and 914 further within the file. A set 903 of compressed blocks have been allocated apriori for all the logical blocks in file 900. A set 905 of uncompressed blocks exists to store data that cannot be compressed small enough to fit within the compressed block in set 903. Like the format of FIG. 6, the uncompressed blocks are allocated as needed, and a data structure 907 is maintained to point to the next available uncompressed block location 909.

For a large file, there could exist multiple directory blocks that track the storage of that file. Each directory block is assigned to a contiguous portion of the file 900. In the example of FIG. 9, directory information about the contiguous portion of file 900 that includes logical blocks 902, 904, and 906 are assigned to directory block 920. Directory information about the contiguous portion of file 900 that includes logical blocks 910, 912, and 914 are stored in directory block 922. In an embodiment, the directory block includes the following information about a logical block: (a) an indicator whether the logical block is maintained in a compressed form; (b) the compressed block that is associated with a given logical block; and (c) the forwarding address or offset of the uncompressed block, if any, for that logical block.

In an embodiment, only logical blocks that is associated with an uncompressed block is stored in a directory block, in which information about logical blocks that are not associated with an uncompressed block are not stored in the directory. In this approach, a first level hash is accomplished by scanning the specific directory block that is associated with a particular logical block. By accessing the directory block, a rapid determination can be made of whether a given logical block is compressed or uncompressed by scanning the directory block associated with the portion of file 900 that includes the logical block, i.e., by determining if information exists in the directory block about that logical block. If the logical block does not appear on directory list, then it can be assumed that the logical block is stored in compressed form, and a straight offset within the set of compressed blocks 903 can be made to retrieve the compressed data. If, however, the logical block appears in the directory list, then the address of the uncompressed block for that logical block is identified and followed to retrieve the stored uncompressed data.

This is the approach illustrated by directory block 922. It is noted that the contiguous portion of file 900 that includes logical blocks 910, 912, and 914 is assigned to directory block 922. In the set 903 of compressed blocks, it can be seen that compressed data has been stored in compressed blocks 912a and 914a, which correspond to logical blocks 912 and 914 respectively. Note that since uncompressed blocks have not been allocated for logical blocks 912 and 914, entries are not maintained in directory block 922 for these logical blocks. However, in this example, an indicator value (the value "0") appears in compressed block 910a indicating the compressed data for associated logical block 910 does not fit within the size constraints of compressed block 910a. Thus, an uncompressed block 910b has been allocated to store the data within logical block 910. A directory entry 910d is maintained in directory block 922 that identifies the logical block, whether the logical block is maintained in compressed form, the compressed block number, and the address of the uncompressed block associated with the logical block. In an embodiment, the compressed block number is not stored.

Alternatively, the directory block can be configured to maintain information about logical blocks even if their contents are not presently stored in an uncompressed block. This is illustrated by directory block 920. Recall that the contiguous portion of file 900 that includes logical blocks 902, 904, and 906 is assigned to directory block 920. In the set 903 of compressed blocks, it can be seen that compressed data has been stored in compressed blocks 902*a* and 904*a*, which correspond to logical blocks 902 and 904 respectively. Even though an uncompressed block has not been allocated for logical block 902, an entry 902*d* is maintained in directory block 920 for this logical block, which identifies this logical block as presently being stored in compressed form in compressed block 902*a*. The address field for an allocated uncompressed block contains an indicator (e.g., the value "0") that indicates that no uncompressed block has been allocated. for the logical block corresponding to entry 902*d*.

Entries can also be maintained for logical blocks which may have been associated with an uncompressed block in the past, but which at present are stored in a compressed block. This may occur, for example, if the data within the logical block has been updated or modified such that the compressed form of that data can fit within the size of a compressed block and the system is configured not to reallocate the uncompressed block to be used by another logical block. Under this circumstance, it is advantageous to continue to track the address of the uncompressed block to be re-used in case the logical block is again updated or modified such that its data no longer fits in compressed form within the compressed block.

In an embodiment, the old uncompressed offset can be read from the directory and stored in the compressed block. Thus, additional directory lookups can be avoided if the system allows these offsets to be saved in the in-memory buffer header after a read. An example of this approach is shown as entry 904*d* in directory block 920, which corresponds to logical block 904. Logical block 904 is presently stored in compressed form in compressed block 904*a*. However, entry 904*d* indicates that while it is presently stored in the compressed format (i.e., as shown in the compressed bit field), an uncompressed block 904*b* has previously been allocated and associated with logical block 904 (as shown in the forwarding address field of entry 904*d*).

The number of logical blocks that is associated with a particular directory block can be configured using multiple factors, such as the structure and content of the directory block and the size of the directory block. In one approach, statistics, heuristics, or empirical evidence may be collected to determine the number of logical blocks that are associated with a directory block. For example, if it is determined that no more than 50 logical blocks from any contiguous group of 500 logical blocks are normally stored in an uncompressed format, and a directory block is sufficiently sized to hold information about 50 logical blocks, then each group of 500 contiguous logical blocks may be assigned to a single directory block. Thus, the first 500 logical blocks in a file are assigned to a first directory block, the second 500 logical blocks are assigned to a second directory block, etc. If too many entries are made to a given directory block, then in an embodiment, part or all of the directory block may be stored onto disk or split into another directory block, e.g., to store entries for compressed logical blocks off-line.

To retrieve data for a given logical block, a first level hash comprises accessing the directory block to determine whether the data for the logical block is compressed, as well as the possible location of that data. The first level hash can be made by determining the sequential number for that logical block in the file, e.g., identifying the appropriate directory block based upon whether the logical block is in the first group of 500 blocks, the second group of 500 blocks, etc. If only uncompressed data is referenced in the directory block, a miss in the directory block indicates that the data is compressed, and the appropriate offset is calculated to identify and retrieve the compressed data from the corresponding compressed block.

Any standard hashing algorithm, e.g., mod( ), can be used to hash a logical block number to a directory block. In an embodiment, consecutive blocks are hashed to the same directory block to reduce the number of directory writes to disk as well as improve locality of reference during directory lookups. In many cases, the database will write a large number of sequential blocks to disk. If consecutive blocks are mapped to the same directory block, even a large write may require writing only couple of directory blocks to disk.

If data access is much more common than data updates, then the directory block can be optimized to enhance access to data in the directory. For example, a common operation that may be performed in the directory is to look up whether a block is stored in compressed format or not.

In one embodiment, it is preferable to arrange the directory entries such that all entries that currently maintain the forwarding address of an uncompressed block are stored first. This places the most likely needed entries at the beginning of the directory. In one embodiment, the directory entries that do not currently reference a forwarding address of an uncompressed block may be optionally removed from the directory. These entries can be recalculated by performing an I/O operation upon the compressed block. Other sorting schemes may also be implemented against a directory block.

If the length of a file is changed, then it may be necessary to add to the allocated compressed or uncompressed blocks for that file. When a file is extended, the directory information may also need to be extended.

In some scenarios, when a large multi-block read is issued, file compression may create the possibility that a single large sequential I/O is split into multiple smaller I/Os because of breaks in contiguity caused by uncompressed logical blocks. In an embodiment, a large sequential I/O is issued knowing that data read-in for some physical blocks may be discarded and issue single logical block I/Os for the uncompressed blocks instead of splitting the multi-block read into several I/Os. For example, assuming 90% of the blocks are in compressed format, a multi-block read of 100 logical blocks of 4 K size will encounter approximately 1 uncompressed block for every 10 blocks. In this circumstance, issuing a large sequential I/O for 100 compressed blocks (resulting in an I/O of 100 K bytes with a compression ratio of 25%), and discarding the data corresponding to the 10 uncompressed blocks and in parallel issue single block asynchronous I/Os for the 10 uncompressed blocks may be more efficient than issuing separate I/O calls for each identified item of data. The compression system can also take advantage of vectored I/Os and batched I/Os in systems that support it, in order to reduce the number of I/O system calls issued to the operating system.

Many I/O subsystems allow asynchronous reads and writes to be submitted to different blocks in the file. In an embodiment, asynchronous reads is not regarded as completed unless the block is read-in and if the block is stored in compressed format, the blocks is uncompressed into the client specified buffer. Further, if an asynchronous multi-block read is split into multiple I/Os because some blocks were compressed and some blocks were not, the I/O completion can be signaled after all the multiple I/Os have completed.

Asynchronous writes may pose a concurrency problem. The client may be allowed to issue asynchronous writes to different parts of the file concurrently because it has presumably obtained the correct locks to prevent concurrent modification of those parts of the file by other processes. However, multiple asynchronous writes to different parts of the file issued by the same process may update the same directory blocks. If a new asynchronous write is issued to a different part of the file, but this write requires update of a directory block that is already being updated by a prior asynchronous write issued even by the same process, the directory update I/O cannot be issued to the OS or the disk subsystem until the directory update due to the first asynchronous write has completed. This serialization of writes to directory blocks from within the same process will not be necessary if the OS/disk subsystem can guarantee that two I/Os issued to the same block will complete in the order that they were issued.

After an asynchronous I/O call is submitted, the system can supply a polling function to check on the completion status of the I/O. With compressed files, a single I/O call may have been converted into multiple asynchronous I/O calls to different locations in the file. The I/O system can signal completion of the original I/O when the underlying I/O calls are complete. A simple method of accomplishing this is to maintain a reference count with the I/O handle used for the original asynchronous I/O call. The reference count is decremented after every dependent I/O completes and the original I/O can be deemed complete when the reference count drops to zero.

In some systems, the clients may presume that a write of a database block is atomic (i.e., it either completes or leaves the block unchanged on disk). When a compressed block becomes uncompressed, the directory blocks may also be updated. The directory change should be logged so that a crash does not leave the directory inconsistent with the actual data, e.g., it would be an error if the directory was updated to show that the block is now in uncompressed format but the instance failed before the write of the uncompressed block in the location specified by the directory. A write can be considered complete if both the data and the directory modification have been stored persistently.

In transactional systems, the recovery system can itself reissue a write for failed writes based on changes collected in the redo log before letting any readers access the data from disk. This can be done by first reading the block from disk, determining if a given change is present in the block and then reapplying the change if the change is not present in the block. Block version or sequence numbers are used to determine if a change is present in the block. Even in these systems, the compression subsystem can write the directory block and then the data block. If the directory block was written but the data block itself was not written to disk, then during recovery, an old version of the block can be read from the wrong location in the file and this version may not contain several changes that were made to the correct location in the file and have since been checkpointed. If, however, the recovery subsystem is enhanced to handle the possibility that there may be two versions of the block on disk, the compression subsystem can return both blocks and the recovery can use the more recent version as the starting point for applying missing changes. With this enhancement, the directory block and data block can be written in parallel to improve write performance. Similarly, the write of the file header to store the new offset of the next uncompressed block can also be performed in parallel with the data block and directory block writes. During recovery the file header can be recovered (if the directory block was written, but the file header was not) and the new offset of the next uncompressed block saved by scanning the directory blocks and determining if a directory entry refers to an offset that is larger than the offset stored in the file header. If, however, the file header is written but the directory block was not we cannot use the same algorithm as the offset contained in the file header may be referenced by a compressed block (i.e. the block pointed to by the offset was once in uncompressed format and has since been compressed). In this case space committed to an uncompressed block may be lost but data integrity will still be preserved.

The present compression approaches are particularly advantageous for certain types of database files. For example, redo log archives are good candidates because they are written only once and read rarely (needed only during media recovery).

System Architecture Overview

Figure 10:
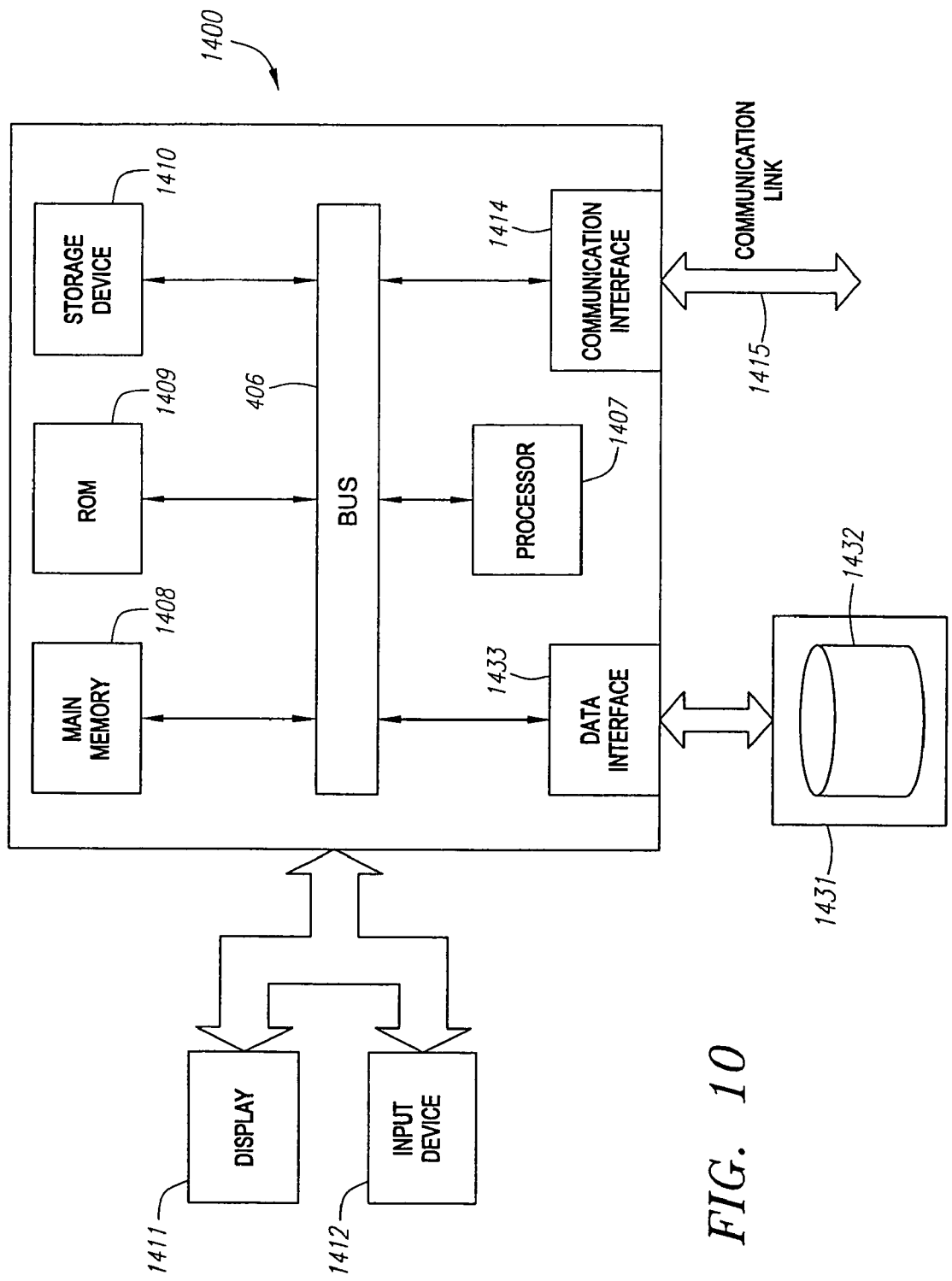
FIG. 10 is a diagram of a computer system with which the present invention can be implemented.

The execution of the sequences of instructions required to practice the invention may be performed in embodiments of the invention by a computer system 1400 as shown in FIG. 10. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 10, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a public telephone service network (PTSN), in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed:

1. A method for updating compressed data in a computer system, comprising:

receiving a request to update compressed data, the compressed data comprising a first data portion that is compressed and a second data portion that is uncompressed, wherein the first data portion is stored in one or more compressed storage units and the second data portion is stored one or more uncompressed storage units; and performing in-line updates of a granular data portion of the compressed data in a compressed storage unit, wherein the in-line update of the granular data portion alters the size of the granular data portion and the granular data portion remains stored in the compressed storage unit.

2. The method of claim 1 in which storage units for the first or second data portions are pre-allocated.

3. The method of claim 1 in which storage units for the first or second data portions are allocated on an as-needed basis.

4. The method of claim 1 in which unused storage space for the compressed data is de-allocated after the update.

5. The method of claim 1 in which a directory corresponding to the compressed data is updated.

6. The method of claim 5 in which the directory is updated to modify forwarding address information.

7. The method of claim 5 in which the directory is updated by removing entries corresponding to data portions that can be compressed to fit within a first compressed size.

8. The process of claim 5 in which the directory is sorted.

9. A computer program product that includes a medium usable by a processor, the medium comprising a sequence of instructions which, when executed by said processor, causes said processor to execute a process for updating compressed data in a computer system, said process comprising:

receiving a request to update compressed data, the compressed data comprising a first data portion that is compressed and a second data portion that is uncompressed, wherein the first data portion is stored in one or more compressed storage units and the second data portion is stored one or more uncompressed storage units; and performing in-line updates of a granular data portion of the compressed data in a compressed storage unit, wherein the in-line update of the granular data portion alters the size of the granular data portion and the granular data portion remains stored in the compressed storage unit.

10. The computer program product of claim 9 in which the first or second data portion is stored in a storage unit that is pre-allocated.

11. The computer program product of claim 9 in which the first or second data portion is stored in a storage unit allocated on an as-needed basis.

12. The computer program product of claim 9 in which unused storage space for the compressed data is de-allocated after the update.

13. The computer program product of claim 9 in which a directory corresponding to the compressed data is updated.

14. The computer program product of claim 13 in which the directory is updated to modify forwarding address information.

15. A system for updating compressed data in a computer system, comprising:

means for receiving a request to update compressed data, the compressed data comprising a first data portion that is compressed and a second data portion that is uncompressed, wherein the first data portion is stored in one or more compressed storage units and the second data portion is stored one or more uncompressed storage units; and means for performing in-line updates of a granular data portion of the compressed data in a compressed storage unit, wherein the in-line update of the granular data portion alters the size of the granular data portion and the granular data portion remains stored in the compressed storage unit.

16. The system of claim 15 in which the first or second data portion is stored in a storage unit that is pre-allocated.

17. The system of claim 15 in which the first or second data portion is stored in a storage unit allocated on an as-needed basis.

18. The system of claim 15, further comprising means for de-allocating an unused storage space for the compressed data.

19. The system of claim 15 in which a directory corresponding to the compressed data is updated.

20. The system of claim 19 in which the directory is updated to modify forwarding address information.

* * * * *

UNITED STATES PATENT AND TRADEMARK OFFICE
CERTIFICATE OF CORRECTION

| | | |
|---|---|---|
| PATENT NO. | : 7,451,290 B2 | Page 1 of 1 |
| APPLICATION NO. | : 11/433174 | |
| DATED | : November 11, 2008 | |
| INVENTOR(S) | : Chandrasekaran et al. | |

It is certified that error appears in the above-identified patent and that said Letters Patent is hereby corrected as shown below:

In page 2, in column 2, line 14, delete "of" and insert -- for --, therefor.

In page 2, in column 2, line 15, delete "SIGMOND" and insert -- SIGMOD --, therefor.

In page 2, in column 2, line 36, delete "(SIGMOND" and insert -- (SIGMOD --, therefor.

In column 1, line 19, delete "modem" and insert -- modern --, therefor.

In column 7, line 4, delete "set." and insert -- set --, therefor.

In column 11, line 16, delete "allocated." and insert -- allocated --, therefor.

Signed and Sealed this

Thirteenth Day of April, 2010

David J. Kappos
*Director of the United States Patent and Trademark Office*